United States Patent [19]

Shimizu

[11] 4,173,620
[45] Nov. 6, 1979

[54] EXTRACTION METHOD OF TRITIUM

[75] Inventor: Masami Shimizu, Hayama, Japan

[73] Assignee: Doryokuro Kakunenryo Kaihatsu Jigyodan, Tokyo, Japan

[21] Appl. No.: 863,614

[22] Filed: Dec. 23, 1977

[30] Foreign Application Priority Data

Dec. 27, 1976 [JP] Japan .................................. 51-160202

[51] Int. Cl.$^2$ ............................................. C01B 4/00
[52] U.S. Cl. ...................................... 423/249; 176/37;
252/301.1 W; 423/580; 423/648 A
[58] Field of Search ................... 423/249, 580, 648 A;
252/301.1 W; 176/37

[56] References Cited

U.S. PATENT DOCUMENTS 3,505,017  4/1970  Roth ................................ 423/244 X
4,008,050  2/1977  Betz .................................... 176/37 X

FOREIGN PATENT DOCUMENTS 2727306  12/1977  Fed. Rep. of Germany ...... 423/648 A

OTHER PUBLICATIONS

Leger; D. et al., "Detritiation de l'eau lourde des Reacteurs Nucléaires", In Eneg. Nucl., (Paris), 12:135–142, 1970.

Primary Examiner—Richard E. Schafer
Attorney, Agent, or Firm—Wenderoth, Lind & Ponack

[57] ABSTRACT

An extraction method of a high purity tritium gas from tritium-containing heavy water is disclosed. Tritium-containing heavy water is led from a heavy water source into an exchange reaction column wherein the heavy water is brought into contact with a tritium-containing heavy hydrogen to thereby transfer tritium in the heavy hydrogen into the heavy water by way of the exchange reaction to obtain a tritium-enriched heavy water. The resulting tritium-enriched heavy water is then led to a heavy hydrogen gas generator such as an electrolytic cell to generate a tritium-enriched heavy hydrogen, a part of which is recycled to the exchange reaction column and the remaining part thereof is led into a hot-wire type thermal diffusion column, e.g. cascade to enrich tritium. The thus enriched tritium gas is withdrawn from the thermal diffusion column cascade. The tritium-depleted heavy hydrogen withdrawn from the exchange reaction column is burnt to produce a tritium-depleted heavy water which is then recycled to both the heavy water source and the exchange reaction column.

8 Claims, 1 Drawing Figure

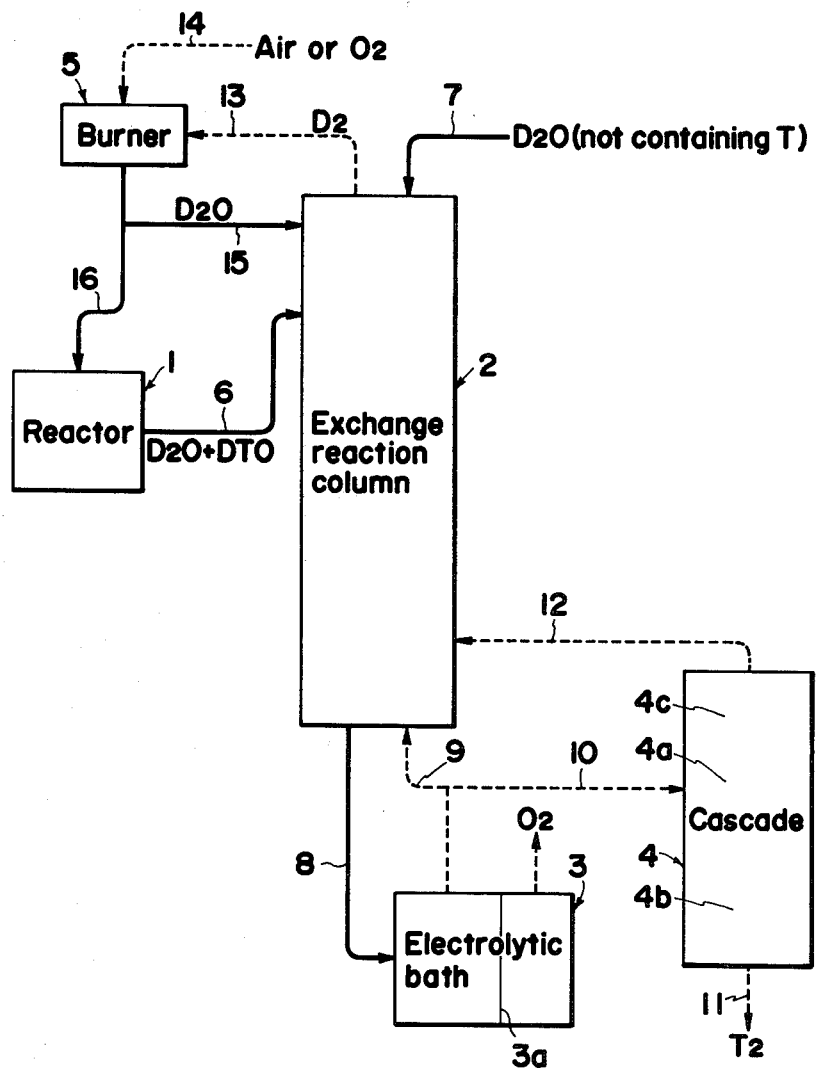

EXTRACTION METHOD OF TRITIUM

BACKGROUND OF THE INVENTION

This invention relates to a method of extracting high purity tritium gas from tritium-containing heavy water.

As a method of producing high purity tritium by extracting tritium produced in heavy water charged in a heavy water reactor, a Laue-Langevin Research Institute system is known. See D. Légsr, G. Divian, and E. Roth, "Deteritiation de léau lourde des reacteurs nucléaires", Energie Nucléaire, 12(2), 135(1970). This system comprises an exchange reaction column for performing the exchange reaction between vapor of heavy water and heavy hydrogen gas at 200° C. in combination with a ultra-low temperature liquefied hydrogen distillation column for enriching tritium contained in the heavy hydrogen. According to this Laue-Langevin Research Institute system, however, since the vapor of the heavy water is brought into concurrent contact with the heavy hydrogen gas at 200° C., the system requires an evaporator for evaporating the heavy water and a condensation separator for separating the vapor of the heavy water and the heavy hydrogen gas. In addition, since tritium is enriched and separated by distillation of ultra-low temperature liquefied hydrogen after it is transferred into the heavy hydrogen gas, the system requires also a helium cycle for providing the ultra-low temperature which results in complication and troublesome operation of the system.

SUMMARY OF THE INVENTION

In view of the abovementioned background, an object of the present invention is to provide a method of extracting high purity tritium from tritium-containing heavy water.

It is another object of the present invention to provide an extraction method of tritium which enables to simplify the whole apparatus and to facilitate the radioaction control.

These and other objects, features and advantages of the invention will be more apparent from the following detailed description and embodiments thereof.

Briefly stated, the present invention pertains to a method of producing a high purity tritium gas by extracting tritium from tritium-containing heavy water. According to the present invention, a part of the tritium-containing heavy water from a heavy water source is first led to an exchange reaction column. In the exchange reaction column, the heavy water is brought into countercurrent contact with a tritium-containing heavy hydrogen to thereby transfer tritium in the heavy hydrogen into the heavy water by way of the exchange reaction. From the bottom of the exchange reaction column is withdrawn the heavy water having an enriched tritium content, and from the top of the exchange reaction column is withdrawn the heavy hydrogen having a reduced tritium content. The thus resulting tritium-enriched heavy water is led to a heavy hydrogen gas generator, such as an electrolytic cell, to generate a tritium-enriched heavy hydrogen. A part of the tritium-enriched heavy hydrogen is recycled to the exchange reaction column to carry out the countercurrent contact between the heavy water and the heavy hydrogen. The remaining part of the tritium-enriched heavy hydrogen is led into a hot-wire type thermal diffusion column e.g. cascade to enrich tritium, and the thus enriched tritium gas is withdrawn from the thermal diffusion column cascade as a product. The tritium-depleted heavy hydrogen withdrawn from the top of the exchange reaction column is burnt to produce a tritium-depleted heavy water which is then recycled to the heavy water source.

BRIEF DESCRIPTION OF THE DRAWING

The present invention is illustrated in the accompanying drawing. The drawing is a schematic block diagram showing an example of the apparatus used for practising the extraction method of tritium in accordance with the present invention.

DETAILED DESCRIPTION OF THE INVENTION

As shown in the drawing, the tritium extraction apparatus as a whole comprises a heavy water moderated reactor 1 as a source for obtaining heavy water containing tritium, a vertical exchange reaction column 2 packed with a hydrophobic platinum catalyst, and a heavy hydrogen gas generator 3 such as, for example, an electrolytic cell, a hot-wire type thermal diffusion column cascade 4 and a burner 5 equipped with a condenser, and these apparatus are mutually connected by piping arrangement. In the drawing, full lines indicate the flow of liquid and broken lines indicate that of gas.

In the heavy water inside the heavy water moderated reactor 1 is produced tritium which is present primarily in the form of DTO. A part of the heavy water containing tritium is withdrawn from the heavy water reactor 1 and fed to the upper portion of the exchange reaction column 2 through a line 6. At the same time, the heavy water not containing tritium may be supplementally supplied to the top of the exchange reaction column 2 through a line 7. Inside the exchange reaction column 2, the heavy water fed from the lines 6 and 7 together flow down and countercurrently contact with tritium-containing heavy hydrogen fed and flowed up from the bottom of the column to carry out the exchange reaction of the following formula in the presence of the hydrophobic platinum catalyst;

$$DT + D_2O \rightleftharpoons D_2 + DTO.$$

This reaction proceeds to the right side at a low temperature and reversely to the left side at a high temperature. The separation factor at 20° C. is given by;

$$[\alpha_D^{Ex} {}_T] 20° C. = \frac{[DTO]/[D_2O]}{[DT]/[D_2]} = 1.61$$

wherein a symbol [] expresses a concentration in mole fraction.

Accordingly, as the tritium-containing heavy water flows down inside the exchange reaction column 2 at room temperature, it deprives tritium contained in the heavy hydrogen gas that upwardly flows, reaches the bottom of the column and is withdrawn outside the column as tritium-enriched heavy water and then led into the electrolytic cell 3 through a line 8.

Inside the electrolytic cell 3, the electrolysis of the heavy water DTO, $D_2O$ is carried out in accordance with the formulas;

$$DTO \rightarrow DT + \tfrac{1}{2}O_2$$

$$D_2O \rightarrow D_2 + \tfrac{1}{2}O_2$$

There is thus generated tritium-enriched heavy hydrogen gas as a mixture of DT and $D_2$. The electrolytic cell 3 is equipped with a diaphragm 3a so that the oxygen simultaneously generated does not admix with the heavy hydrogen. The major portion of the tritium-enriched heavy hydrogen gas generated in the electrolytic cell 3 is supplied to the bottom of the exchange reaction column 2, and the remaining portion of the tritium-enriched heavy hydrogen gas is supplied to the upper portion of the hot-wire type thermal diffusion column cascade 4 through a line 10.

The portion below a gas feed section 4a of the hot-wire type thermal diffusion column cascade 4 is a tritium enriching section 4b and the portion thereabove is a tritium depleting section 4c. In the hot-wire type thermal diffusion column of this type, a red heated hot wire (such as nickel-chromium alloy, tungsten, platinum, etc.) exhibits its catalytic action, and the following conversion reaction is constantly performed;

$$2DT \rightarrow D_2 + T_2.$$

Accordingly, tritium gas $T_2$ is naturally enriched at the bottom of the hot-wire type thermal diffusion column cascade, thereby enabling to withdraw a tritium gas of a purity of 99% or more from a line 11.

On the other hand, from the depleting section 4c of the hot-wire type thermal diffusion column cascade 4 is recovered heavy hydrogen having a lower tritium content than the heavy hydrogen supplied thereto through the line 10, and is withdrawn from the top of the cascade 4 and recycled to a suitable part of the exchange reaction column 2.

The tritium-containing heavy hydrogen supplied to the exchange reaction column 2 from the electrolytic cell 3 and the hot-wire type thermal diffusion column cascade 4 through the lines 9, 12, respectively, flows upward inside the exchange reaction column 3, as mentioned above. In the course of the up-flowing, the tritium-containing heavy hydrogen is brought into contact, in the presence of the hydrophobic platinum catalyst packaged in the column, with the heavy water which is flowing down, to thereby transfer tritium in the heavy hydrogen into the heavy water by way of the exchange reaction. Accordingly, the heavy hydrogen gas is substantially deprived of its tritium before it reaches the top of the column. The resulting tritium-depleted heavy hydrogen gas is then led from the top of the column to the burner 5 equipped with a condenser through a line 13. Due to the catalytic action of platinum or palladium, the burner 5 is operated at ordinary temperature or below 40°–50° C. under atmospheric pressure, and the heavy hydrogen gas fed into the burner is oxidized by means of air or oxygen led through a line 14 and is condensed and liquefied into tritium-depleted heavy water.

A part of the resulting heavy water may be recycled to the top of the exchange reaction column 2 through a line 15 and the rest may be fed back to the heavy water moderated reactor 1 through a line 16. By recycling a part of the resulting heavy water to the top of the exchange reaction column 2 through the line 15, the amount of tritium in the heavy hydrogen gas withdrawn from the top of the exchange reaction column, and thus in the heavy water fed back to the reactor 1, can significantly be reduced.

In this manner, it is possible to produce tritium gas of a high purity from the tritium-containing heavy water.

Next, the present invention will be explained with reference to definite numeric values in order to further facilitate the understanding of the invention.

In a heavy water moderated power reactor having an output of 250,000 KWe, for example, about 100t of the heavy water as a moderator is charged into the reactor. Tritium is produced in the heavy water. If this tritium is not removed from the heavy water, the reactor reaches the steady state at a tritium concentration of about 50 Ci/l heavy water. Hence, the explanation will be given on the case where a tritium gas having a purity of not lower than 99% is produced while keeping the tritium concentration at 0.5 Ci/l heavy water which is 1/100 of the abovementioned concentration.

From 100t of the heavy water charged into the power reactor, the heavy water is constantly withdrawn at a rate of 70 l/hour and fed to the exchange reaction column. The exchange reaction column has 20 theoretical plates, i.e., 15 theoretical plates for the tritium enriching section and 5 theoretical plates for the tritium depleting section, and is packed with the granular hydrophobic platinum catalyst. The exchange reaction column is operated at 20° C. In the electrolytic cell, the tritium-enriched heavy water is electrolyzed at a temperature below about 60° C. and the resulting tritium-enriched heavy hydrogen is separated from oxygen by means of the diaphragm. After the vapor of the heavy water is removed from the heavy hydrogen as much as possible, the major part of the resulting heavy hydrogen is fed back to the exchange reaction column, and the remaining small part, such as about 1/10,000, of the resulting heavy hydrogen is supplied to the thermal diffusion column cascade. The volume of the tritium-enriched heavy hydrogen supplied to the cascade may vary from about 1/1,000 to about 1/10,000 of the total volume of the tritium-enriched heavy hydrogen produced in the electrolytic cell, depending on the capacity of the thermal diffusion column cascade.

The cascade has a separation factor of $10_4$ at the enriching section. Namely, it is a four-stage cascade consisting of a hot-wire type thermal diffusion column having an iron type hot-wire which has a diameter of 1.5 mm and a length of 2,000 mm, and is heated to 700°–800° C. Since the outer wall is cooled with water, the cascade as a whole is kept at a temperature below 40°–50° C. and operated under atmospheric pressure. In place of the iron type hot-wire, a platinum type hot-wire having a diameter of 0.3 mm may be employed in the cascade.

Using the apparatus having the above-described construction, it is possible to produce about 25 g (about 250,000 Ci) per annum of tritium gas having a purity of about 99.5%. On the other hand, the tritium-depleted heavy hydrogen gas flowing out from the top of the exchange reaction column is converted into the heavy water by the burner/condenser and fed back to both the heavy water moderated power reactor and the exchange reaction column. Its tritium concentration is 0.05 Ci/l heavy water. The heavy water to be supplemented to the top of the exchange reaction colum is less than about 100 g per annum.

Though the abovementioned embodiment deals with the production method of tritium by extracting tritium contained in the heavy water inside the heavy water moderated reactor, the present invention is not specifically restricted to such an embodiment. For example, it is also possible to apply the method of the invention to the production of tritium by extracting tritium from tritium-containing light water obtained from a nuclear fuel reprocessing plant and the like.

Since the present invention is constructed as mentioned above, hardly any turning device is required with the exception of the feeding device for supplying the heavy water to the exchange reaction column and the transfer of the fluids is enabled by the gravity or the own force of the gas generated. In addition, since each apparatus is substantially free from a high-temperature section and a low-temperature section and can be operated under an atmospheric pressure, the apparatus as a whole can remarkably be simplified and the radioaction control becomes easy. When a heavy water moderated reactor is used as the heavy water source, the present invention provides the advantage that the safety management of the reactor can easily be made.

It is to be noted that while the present invention has been shown and described with reference to the most preferred embodiment thereof, the invention is not intended to be so limited, and various modifications and changes may be apparent to those skilled in the art without departing from the scope and spirit of the invention as set forth in the appended claims.

What is claimed is:

1. A method of extracting tritium from tritium-containing heavy water which comprises:
    leading a part of the tritium-containing heavy water from a heavy water source to an exchange reaction column wherein the heavy water is brought into countercurrent contact with a tritium-containing heavy hydrogen to thereby transfer tritium in the heavy hydrogen into the heavy water by way of the exchange reaction;
    withdrawing the heavy water having an enriched tritium content from the bottom of said exchange reaction column and the heavy hydrogen having a reduced tritium content from the top of said exchange reaction column;
    leading the tritium-enriched heavy water to a heavy hydrogen gas generator to generate a tritium-enriched heavy hydrogen;
    recycling a part of the tritium-enriched heavy hydrogen to said exchange reaction column to carry out the countercurrent contact between the heavy water and the heavy hydrogen;
    burning the tritium-depleted heavy hydrogen withdrawn from the top of the exchange reaction column to produce a tritium-depleted heavy water;
    recycling the tritium-depleted heavy water to the heavy water source; p1 leading the remaining part of the tritium-enriched heavy hydrogen generated from the heavy hydrogen gas generator into a hot-wire type thermal diffusion colunm to enrich tritium; and
    withdrawing the tritium gas from the thermal diffusion column.

2. The method according to claim 1, wherein said exchange reaction column is a column packed with a hydrophobic platinum catalyst, and the exchange reaction is carried out in the presence of the catalyst at room temperature.

3. The method according to claim 1, wherein said heavy hydrogen gas generator is an electrolytic cell equipped with a diaphragm and generates the tritium-enriched heavy hydrogen by electrolyzing the tritium-enriched heavy water, the diaphragm preventing oxygen simultaneously generated from being admixed with the heavy hydrogen generated.

4. The method according to claim 1, wherein said burning of the tritium-depleted heavy hydrogen is carried out in the presence of a platinum or palladium catalyst to allow the tritium-depleted heavy hydrogen to react with oxygen at a temperature below 50° C. under atmospheric pressure.

5. The method according to claim 1, wherein a heavy hydrogen having a lower tritium content than the tritium-enriched heavy hydrogen is recovered and withdrawn from the thermal diffusion column, and then recycled to the exchange reaction column.

6. The method according to claim 1, wherein a part of the tritium-depleted heavy water produced by burning the tritium-depleted heavy hydrogen is recycled to the heavy water source and the remaining part of the tritium-depleted heavy water is recycled to the top of the exchange reaction column.

7. The method according to claim 1, wherein the heavy water source is a heavy water moderated reactor.

8. The method according to claim 1 wherein a thermal diffusion column is employed in a cascade arrangement.

* * * * *